United States Patent
Vandecruys et al.

(10) Patent No.: US 11,739,024 B2
(45) Date of Patent: Aug. 29, 2023

(54) GLASS CONTAINER HAVING AN INKJET PRINTED IMAGE AND A METHOD FOR THE MANUFACTURING THEREOF

(71) Applicant: Anheuser-Busch InBev S.A., Brussels (BE)

(72) Inventors: Jonas Vandecruys, Leuven (BE); Marin Steenackers, Leuven (BE); Johan Van de Velde, Leuven (BE); Frederik De Graaf, Leuven (BE)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 170 days.

(21) Appl. No.: 16/098,126

(22) PCT Filed: May 11, 2017

(86) PCT No.: PCT/EP2017/061284
§ 371 (c)(1),
(2) Date: Oct. 31, 2018

(87) PCT Pub. No.: WO2017/194656
PCT Pub. Date: Nov. 16, 2017

(65) Prior Publication Data
US 2019/0152844 A1    May 23, 2019

(30) Foreign Application Priority Data

May 12, 2016 (EP) ..................... 16169473
Nov. 17, 2016 (EP) ..................... 16199357

(51) Int. Cl.
| C03C 17/00 | (2006.01) |
| B41M 5/00 | (2006.01) |
| B41J 3/407 | (2006.01) |
| B41J 11/00 | (2006.01) |
| C03C 17/38 | (2006.01) |
| B65B 3/04 | (2006.01) |
| B65D 23/08 | (2006.01) |
| B65D 85/72 | (2006.01) |
| C03C 17/42 | (2006.01) |
| C03C 25/002 | (2018.01) |

(52) U.S. Cl.
CPC .......... *C03C 17/005* (2013.01); *B41J 3/4073* (2013.01); *B41J 3/40733* (2020.08); *B41J 11/0015* (2013.01); *B41M 5/007* (2013.01); *B41M 5/0011* (2013.01); *B41M 5/0047* (2013.01); *B41M 5/0088* (2013.01); *B65B 3/04* (2013.01); *B65D 23/0814* (2013.01); *B65D 85/72* (2013.01); *C03C 17/38* (2013.01); *C03C 17/42* (2013.01); *C03C 25/002* (2013.01); *B41M 2205/40* (2013.01); *C03C 2217/72* (2013.01)

(58) Field of Classification Search
CPC ....... C03C 17/005; C03C 17/38; C03C 17/42; C03C 25/002; C03C 2217/72; B41J 3/4073; B41J 11/0015; B41M 5/0011; B41M 5/0047; B41M 5/007; B41M 5/0088; B41M 2205/40; B65B 3/04; B65D 23/0814; B65D 85/72
USPC ......................................................... 53/411
See application file for complete search history.

(56) References Cited

U.S. PATENT DOCUMENTS

| 3,952,118 | A | | 4/1976 | Novice | |
|---|---|---|---|---|---|
| 4,289,816 | A | * | 9/1981 | Fogelberg | ............... C03C 17/23 427/226 |
| 5,584,903 | A | | 12/1996 | Guthrie | |
| 6,733,836 | B2 | * | 5/2004 | Bourne | ..................... B44C 1/04 427/307 |
| 8,020,359 | B2 | * | 9/2011 | Mattos, Jr. | ............. G06Q 99/00 53/411 |
| 8,609,197 | B1 | * | 12/2013 | Remington, Jr. | ....... C03C 17/42 427/470 |
| 9,918,898 | B2 | * | 3/2018 | Fadeev | ................. C03C 17/005 |
| 10,279,599 | B2 | | 5/2019 | Till | |
| 2003/0054106 | A1 | | 3/2003 | Bourne | |
| 2012/0034435 | A1 | * | 2/2012 | Borrelli | ................... C03C 17/30 428/210 |
| 2013/0076828 | A1 | * | 3/2013 | Tombs | ................. B41M 5/0011 347/20 |
| 2013/0157826 | A1 | * | 6/2013 | Preckel | ................... B29B 17/02 493/53 |

(Continued)

FOREIGN PATENT DOCUMENTS

| CN | 1304339 A | 7/2001 |
|---|---|---|
| DE | 69214528 | 3/1997 |

(Continued)

OTHER PUBLICATIONS

Thorp, Debbie, "Inkjet Printing—Flat and Container Glass," (Internet citation) www.globalinkjetsystems.com, Nov. 30, 2015.

(Continued)

*Primary Examiner* — Dariush Seif
(74) *Attorney, Agent, or Firm* — Dority & Manning, P.A.

(57) ABSTRACT

A glass container has an outer glass surface with an inkjet printed image provided on the surface. A cold-end coating (CEC) with a thickness between 0 to 20 nm is present between the outer glass surface and the inkjet printed image. Such glass container is preferably a one-way beverage bottle. A method of inkjet printing an image on a glass container comprises the steps of (a) manufacturing a glass container having a CEC layer; (b) removing at least part of the CEC layer to a level wherein the remaining CEC layer has a thickness of 0 to 20 nm; and (c) inkjet printing an image on the glass container.

8 Claims, No Drawings

(56) References Cited

U.S. PATENT DOCUMENTS

| | | | |
|---|---|---|---|
| 2013/0176369 A1 | 7/2013 | Gotou et al. | |
| 2013/0224407 A1* | 8/2013 | Fadeev | C03C 17/30 428/34.7 |
| 2013/0334089 A1 | 12/2013 | Remington, Jr. | |
| 2014/0220327 A1* | 8/2014 | Adib | C03C 17/3452 428/217 |
| 2014/0320574 A1* | 10/2014 | Kraus | B41M 5/0088 347/110 |
| 2015/0002591 A1 | 1/2015 | Kozee et al. | |
| 2015/0059600 A1 | 3/2015 | Heidrich et al. | |
| 2015/0225285 A1 | 8/2015 | Domey et al. | |
| 2016/0145150 A1* | 5/2016 | Bookbinder | A61J 1/1468 65/31 |
| 2016/0221359 A1* | 8/2016 | Till | B41M 1/40 |

FOREIGN PATENT DOCUMENTS

| | | | |
|---|---|---|---|
| DE | 102013215637 | 3/2015 | |
| DE | 102013217659 | 3/2015 | |
| EP | 2 591 917 | 5/2013 | |
| EP | 3375763 A1 * | 9/2018 | B67C 3/02 |
| GB | 1 471 293 | 4/1977 | |
| WO | WO 97/03137 | 1/1997 | |
| WO | WO-9962645 A1 * | 12/1999 | C03C 17/32 |
| WO | WO 2011/127294 | 10/2011 | |
| WO | WO 2013/167558 | 11/2013 | |
| WO | WO 2014/085246 | 6/2014 | |
| WO | 2015/036588 | 3/2015 | |
| WO | WO 2017/194656 | 11/2017 | |

OTHER PUBLICATIONS

Chinese First Office Action (w/ English translation) for corresponding CN Application No. 201780040670.8, dated Apr. 30, 2021, 22 pages.
Chinese Second Office Action (w/ English translation) for corresponding CN Application No. 201780040670.8, dated Nov. 8, 2021, 35 pages.
European Notice of Opposition (w/ English machine translation) for corresponding European Application No. 17722043.1, dated Aug. 23, 2022, 106 pages.
Citation No. D10 (w/ English machine translation) from European Notice of Opposition for corresponding European Application No. 17722043.1, Wikipedia excerpt of Mar. 13, 2016 on "beer bottle" 3 pages.
Citation No. D11 from European Notice of Opposition for corresponding European Application No. 17722043.1, Feature analysis of claims 1 and 9, 1 page.
Citation No. D13 from European Notice of Opposition for corresponding European Application No. 17722043.1, Certificate for Patent Application No. 16169473.2/EP16169473, 20 pages.
Citation No. D14 from European Notice of Opposition for corresponding European Application No. 17722043.1, Certificate for Patent Application No. 16199357.1/EP16199357, 21 pages.
Citation No. D20 (w/ English machine translation) from European Notice of Opposition for corresponding European Application No. 17722043.1, Affidavit of Mr. Roland Laumer, 4 pages.
Citation No. D21 (w/ English machine translation) from European Notice of Opposition for corresponding European Application No. 17722043.1, Protocol of the acceptance of Jun. 17 and 18, 2020, 14 pages.
Citation No. D22 from European Notice of Opposition for corresponding European Application No. 17722043.1, Minutes of acceptance from Dec. 8, 2016, 3 pages.
Citation No. D23 from European Notice of Opposition for corresponding European Application No. 17722043.1, Excerpts from SAP for the machine sold, 1 page.
Citation No. D24 from European Notice of Opposition for corresponding European Application No. 17722043.1, Excerpts from SAP for the machine sold, 1 page.
Citation No. D25 from European Notice of Opposition for corresponding European Application No. 17722043.1, Excerpts from SAP for the machine sold, 1 page.
Citation No. D26 (w/ English machine translation) from European Notice of Opposition for corresponding European Application No. 17722043.1, Excerpts from SAP for the machine sold, 2 pages.
Citation No. D27 from European Notice of Opposition for corresponding European Application No. 17722043.1, Excerpts from SAP for the machine sold, 1 page.
Citation No. D28 (w/ English machine Translation) from European Notice of Opposition for corresponding European Application No. 17722043.1, Excerpts from SAP for the machine sold, 2 pages.
Citation No. D29 (w/ English machine translation) from European Notice of Opposition for corresponding European Application No. 17722043.1, Excerpts from SAP for the machine sold, 2 pages.
Citation No. D30 (w/ English machine translation) from European Notice of Opposition for corresponding European Application No. 17722043.1, Excerpts from SAP for the machine sold, 2 pages.
Citation No. D31 from European Notice of Opposition for corresponding European Application No. 17722043.1, Excerpts from SAP for the machine sold, 1 page.
Citation No. D32 from European Notice of Opposition for corresponding European Application No. 17722043.1, Excerpts from SAP for the machine sold, 1 page.
Citation No. D33 (w/ English machine translation) from European Notice of Opposition for corresponding European Application No. 17722043.1, Excerpts from SAP for the machine sold, 2 pages.
Citation No. D34 from European Notice of Opposition for corresponding European Application No. 17722043.1, Excerpts from SAP for the machine sold, 1 page.
Citation No. D35 (w/ English machine translation) from European Notice of Opposition for corresponding European Application No. 17722043.1, Excerpts from SAP for the machine sold, 3 pages.
Citation No. D36 from European Notice of Opposition for corresponding European Application No. 17722043.1, Excerpts from SAP for the machine sold, 1 page.
Citation No. D37 from European Notice of Opposition for corresponding European Application No. 17722043.1, Excerpts from SAP for the machine sold, 1 page.
Citation No. D38 (with English machine translation) from European Notice of Opposition for corresponding European Application No. 17722043.1, Technical details of the flame treatment system, "Flame Treatment with Silicating", Arcotec GmbH, 2009, 21 pages.
Citation No. D39 from European Notice of Opposition for corresponding European Application No. 17722043.1, Technical details of the 1002G6 printhead, "Xaar 1002 GS6/GS12", Xaar Datasheet 1002 (UK), Feb. 2014, 2 pages.
Citation No. D40 from European Notice of Opposition for corresponding European Application No. 17722043.1, Order from Dohler GmbH, Apr. 23, 2014, 4 pages.
Citation No. D41 from European Notice of Opposition for corresponding European Application No. 17722043.1, Order confirmation by Krones AG, Apr. 30, 2014, 15 pages.
Citation No. D42 from European Notice of Opposition for corresponding European Application No. 17722043.1, Waybill dated Apr. 14, 2015, 1 page.
Citation No. D43 from European Notice of Opposition for corresponding European Application No. 17722043.1, Final invoice dated May 18, 2015, 2 pages.
Citation No. D44 from European Notice of Opposition for corresponding European Application No. 17722043.1, Measurement protocol of the Faculty of Mechanical Engineering of the Metallographic Laboratory of the University of West Bohemia in, "Analysis of the thin layer on a glass surface", 9 pages.
Citation No. D45 from European Notice of Opposition for corresponding European Application No. 17722043.1, Order dated Aug. 4, 2022 from Dekron GmbH, 2 pages.
Third Chinese Office Action (with English machine translation) for corresponding Chinese Application No. 201780040670.8, dated Mar. 2, 2022, 25 pages.
Cen et al., "Modern Bottle Making Technology and Quality Inspection", (w/ English machine translation), Light Industry Press, No. 171, 1983, 20 pages.

(56) References Cited

OTHER PUBLICATIONS

Yaoliang et al., "Color Photography Development Technology", (w/ English machine translation of relevant pages), Printing Industry Press, 1993, 4 pages.
European Patent Office Brief Communication (w/ English translation) for corresponding European Application No. 17722043.1, dated Mar. 20, 2023, 93 pages.
Wikipedia, "Kontaktwinkel" (w/ English translation), edit date Sep. 18, 2015, https://de.wikipedia.org/w/index.php?title=Kontaktwinkel&oldid=146175478, 4 pages.

* cited by examiner

GLASS CONTAINER HAVING AN INKJET PRINTED IMAGE AND A METHOD FOR THE MANUFACTURING THEREOF

FIELD OF THE INVENTION

The present invention relates to glass containers, in particular glass bottles, decorated with printed images on the glass surface. Further, the present invention relates to a method for manufacturing such glass containers.

BACKGROUND OF THE INVENTION

It is commonly known in the art that beverage bottles bear a lubricious and protective transparent coating, the so-called cold-end coating (CEC), at the outer surface. Such CEC prevents the glass container from being scratched and protects it in abrasive or caustic environment. The CEC, typically a polyethylene wax causes the glass surface to become slippery. The resulting low friction coefficient diminishes the forces in bottle-to-bottle contact in bottling lines and transport. Bottles coated in this way move freely through inspection and filling lines and sustain less surface damage. A damaged surface looks bad to the consumer and weakens the glass, often resulting in premature breakage. In addition, instead of accepting an increase in bursting pressure, the bottle may be made lighter while still retaining its strength.

Nowadays in glass container manufacturing a two-step coating is applied in order to obtain scratch resistance and slipperiness of the glass containers. In the first step, the so called hot-end coating (HEC) is typically applied by means of chemical vapor deposition (CVD) of a metal containing compound on the freshly formed, hot and single or double line positioned glass containers. Such a HEC is based on coating precursor that includes tin, titanium other heat decomposable metallic or organometallic compounds. This application is done inside a so called coating tunnel or coating hood where the HEC is applied by chemical vapor deposition in forming a thin layer of a metal oxide, for example tin oxide. The objective is to coat the outside of the glass container with a homogenous even layer except for the so called finish. Since this is done in vapor phase and on single line conveyed glass containers, a relatively homogeneous distribution can be achieved easily. The thin layer of metal oxide, often tin oxide, is the basis for the second coating, the so called cold-end coating (CEC). After the HEC application, the glass containers are usually submitted through a special type of oven called also annealing lehr. Latter is designed specifically for annealing glass and to cool down the containers in a controlled way. The glass is heated to the annealing point and then slowly cooled down. This process relieves the internal stresses, making the glass much more durable.

In a subsequent process step, images of the logo, ingredients, etc. corresponding the content of the bottle are typically printed on the CEC, e.g. by screen printing.

However, a main problem is that in all industries, in particular packaging industry, printing is continuously moving towards digitization with greater speed, quality, flexibility and efficiency. Unfortunately, screen printing is not a digital printing technique, as for example inkjet printing is. Also offset and flexographic printing systems are being increasingly replaced for printing applications by industrial inkjet printing systems due to their flexibility in use, e.g. variable data printing, and due to their enhanced reliability, allowing their incorporation into production lines.

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting the inkjet ink onto an ink-receiver, the ink typically includes a liquid vehicle and one or more solids, such as dyes or pigments and polymers. Ink compositions can be roughly divided in: water-based, the drying mechanism involving absorption, penetration and evaporation; solvent-based, the drying primarily involving evaporation; oil-based, the drying involving absorption and penetration; hot melt or phase change, in which the ink is liquid at the ejection temperature but solid at room temperature and wherein drying is replaced by solidification; and energy-curable, in which drying is replaced by polymerization induced by exposing the ink to a radiating or thermal energy source.

The first three types of ink compositions are more suitable for an absorbing receiving medium, whereas hot melt inks and energy-curable inks can also be printed on non-absorbing ink-receivers. Due to thermal requirements posed by hot melt inks on the substrates, especially radiation curable inks have gained the interest of the packaging industry.

However, inkjet printing on glass containers which need a CEC during manufacturing for the reasons mentioned above, such as bottles, has been proven still to be difficult and to result in poor image quality of the prints.

As a result, there remains a need for optimized inkjet printing methods for glass containers which need a CEC, especially in high speed processes such as beverage bottling lines.

SUMMARY OF THE INVENTION

The present invention is directed to a glass container having an outer glass surface with an inkjet printed image provided on said surface, characterized in that a CEC with a thickness between 0 to 20 nm is present between the outer glass surface and the inkjet printed image.

In an embodiment in accordance with the present invention, the glass container has an outer glass surface with an inkjet printed image provided on said surface, characterized in that the glass container has an internal burst pressure of at least 7 bar, and in that no CEC, or a CEC with a thickness of less than 20 nm is present between the outer glass surface and the inkjet printed image.

Such glass container is preferably a one-way beverage bottle.

In addition, the present invention is directed to a method of inkjet printing an image on a glass container comprising the steps of:
a) manufacturing a glass container having a CEC layer;
b) removing at least part of the CEC layer to a level wherein the remaining CEC layer has a thickness of 0 to 20 nm;
c) inkjet printing an image on the glass container.

In an embodiment in accordance with the present invention, the method comprises the steps of:
a) manufacturing a glass container having an at least partially water soluble CEC layer;
b) removing at least part of the CEC layer to a level wherein the remaining CEC layer has a thickness of 0 to 20 nm by rinsing the CEC from the glass container with water and blowing the water from the container by means of a pressurized air stream,
c) inkjet printing an image on the glass container.

DETAILED DESCRIPTION OF THE INVENTION

It is now recognized that the reasons why ink-jet printing on glass containers which need a CEC has been proven still to be difficult and to result in poor image quality of the prints, are the following:

First, it is believed, without being bound by any theory, that the CEC might interfere with bonding of inkjet inks and adhesion at the glass surface.

Secondly, since the containers are positioned in several rows upon leaving the cooling oven, the application of CEC happens by spray gun or guns which move parallel between the respective rows of the containers, positioned above or just between the rows at shoulder height of the containers. Such spray pattern leads automatically to an inhomogeneous distribution of coating material.

Although WO2013167558 describes an improved method for applying a CEC integrated in glass container manufacturing process, the method disclosed therein can only be applied in a single line conveyer belt configuration and not in a traditional and widely used multi-row mass conveyer belt configuration.

Thirdly, for a good ejecting ability and fast inkjet printing, the viscosity of inkjet inks is typically much lower as compared to e.g. screen printing inks. Without being bound by any theory, lower viscosity of the inkjet ink exhibits higher mobility on a surface to be printed and higher dependency on the homogeneity of the surface. The poor image quality of the prints might thus be a result of the high mobility of the lower-viscous inkjet inks before solidification by e.g. evaporation and/or polymerization, and the inhomogeneous distribution of CEC material as described here above. I.e. the lower-viscous and mobile inkjet ink droplets have the tendency to wet and move to surface regions with a higher surface energy resulting in print defects.

It was now unexpectedly found that by removing at least part of the CEC layer of the glass substrate to a level wherein the remaining CEC layer has a thickness of 0 to 20 nm, or is substantially completely removed, adhesion as well as print quality of the prints, e.g. color aberrations and resolution is significantly improved compared to print quality on a glass substrate from which the CEC was not at least partially removed. Without being bound by any theory, the assumed reason for an improved print quality is that by removing at least part of the CEC layer to a level wherein the remaining CEC layer has a thickness of 0 to 20 nm, the surface homogeneity is increased and results in a reduced tendency of the mobile and lower-viscous inkjet inks to move on the surface before solidification In a first embodiment, the present invention provides a glass container having an outer glass surface with an inkjet printed image provided on said surface, characterized in that a CEC with a thickness between 0 to 20 nm is present between the outer glass surface and the inkjet printed image. A thickness of 0 to 20 nm is equivalent to a few monolayers or less. Preferably, the thickness of the CEC is between 0 and 10 nm, and even more preferably between 0 and 5 nm, and most preferably the CEC is completely removed.

In an embodiment in accordance with the present invention, the glass container has an outer glass surface with an inkjet printed image provided on said surface, characterized in that the glass container has an internal burst pressure of at least 7 bar, and in that no CEC, or a CEC with a thickness of less than 20 nm is present between the outer glass surface and the inkjet printed image.

As explained above, a CEC provides increased scratch protection and improves durability, appearance, and internal burst pressure of the glass container. By printing on glass containers which had a CEC during process steps preceding printing and removing that CEC, or part of it, just before the printing step, a glass container is obtained that, after being exposed to the printing step, still has an internal burst pressure of at least 7 bar, or at least 8 bar, or at least 9 bar.

Further, an embodiment may be provided wherein a HEC may be present between the outer glass surface and the CEC or between the outer glass surface and the inkjet printed image. In the latter case, CEC is removed and has a thickness of 0 nm or substantially 0 nm.

Without being bond to any theory, the excellent print quality on substrates in which a HEC is present between the outer glass surface and the inkjet printed image may be explained by the homogeneous distribution of the HEC since the HEC is usually applied in vapor phase and on single line conveyed glass containers as explained here above.

The HEC typically comprises a metal oxide layer, typically a layer of 5 to 20 nm. More specifically, said metal oxide in the metal oxide layer may be chosen from the group comprising: tin oxide, titanium oxide, zirconium oxide and/or combinations thereof, as described in U.S. Pat. Nos. 3,952,118 and 489,816.

In a particular embodiment in accordance with the present invention, the metal oxide layer of the HEC may be a tin oxide obtained from monobutyltinchloride (MBTC) as a precursor.

Typical examples of CECs applied on glass containers may be polyethylene, partially oxidized polyethylene, polyglycols, oleic acid or stearate based coatings.

In an embodiment of a glass container of the present invention, the CEC may be at least partially water soluble between 20 and 90° C., preferably at 40° C. Besides benefits in the production of inkjet printed glass containers as will be explained further in this text, an at least partially water soluble CEC may be beneficial for recycling one-way glass container waste since it can be removed at least partially by rinsing with water between 20 and 90° C., preferably at 40° C.

In the context of the present invention, the CEC being at least partially water soluble is understood as the CEC being removed at least partially by technical water, tap water, purified water or distilled water such that the bottle's slip angle increases with at least 6° after washing vs. before washing. Slip angles are determined by putting one bottle on top of two horizontal bottles of the same type, in line contact. The tilt angle is increased at a certain speed and the tilt angle on which the top bottle starts to slide off is called the slip angle. A slip angle may have value of more than 30° to less than 10°.

In particular, the at least partially water soluble CEC may be fatty acid based, preferably stearate based. In another particular preferred embodiment, the at least partially water soluble CEC may be polyethylene glycol based.

In another embodiment of a glass container of the present invention, the CEC may be at least partially oxidized by flame, corona, or plasma treatment. It is known in the art that organic screen printing inks do not adhere well to glass containers having been treated with CEC, and that flame, corona or plasma energy may be applied to the glass containers to achieve better adhesion of an organic coating (e.g. an inkjet ink) thereto.

Further, a glass container according to the present invention may comprise a silicon containing layer, preferably a silica containing layer (eg. pyrosil), between the CEC and the inkjet printed image. Such silicon containing layer provides increased bonding sites for the inkjet printed layer(s). Furthermore, they may result in a rough nanoporous material surface for increased adhesion and a surface with a higher surface energy. It may be deposited for example by flame pyrolysis. Precursors may be delivered as a vapor, an atomized liquid, an atomized solution, and/or the like.

A primer layer may be present between the outer glass surface and the inkjet printed image in order to enhance adhesion of the ink, i.e. on the CEC or on the HEC, or on a silica containing layer (eg. pyrosil). Such primer may be pigmented, white or transparent and may comprise an adhesion promotor. Such primer may also be oxidized by flame, corona, or plasma treatment to enhance adhesion of the inkjet ink. A white pigmented primer, typically containing e.g. titanium dioxide, is preferably used to enhance the contrast and the vividness of color inks printed on a primed substrate. This is especially effective when the substrate is transparent. In particular, the primer may comprise a radically reactive group moiety such as a thiol group, an amine group, or an ethylenically unsaturated group such as a vinyl ether, a vinyl ester, an acrylamide, a methacrylamide, a styril, or preferably an allyl, an acrylate, or a methacrylate.

The inkjet printed image on a glass container according to the present invention may comprise one or more layers of ink, preferably energy-cured ink, i.e. the ink may be cured in any suitable manner, for example, radiation-cured by any suitable type of radiation like, for instance, ultraviolet, electron beam, or the like, or thermally-cured by convection oven, infrared lamps, or the like, or a combination of both radiation and thermal energy.

On the inkjet printed glass container, a protective layer and/or a clear coating may be applied for protecting the image and/or achieving a more glossy or mat impression (or another optical effect).

The inkjet printed image may have a printing resolution of at least 300 dpi.

After printing, a friction coefficient reduction coating may applied on the entire glass container.

A glass container in accordance with the present invention may be a glass bottle, preferably a beverage bottle and most preferably a one-way beverage bottle. A returnable glass container which is exposed to caustic rinses after use, would lack HEC after a limited number of returns.

Further, a glass container in accordance with the present invention may be preferably cylindrical bottle.

In an additional aspect of the present invention, an embodiment is provided of a method of inkjet printing an image on a glass container comprising the steps of:
a) manufacturing a glass container having a CEC layer;
b) removing at least part of the CEC layer to a level wherein the remaining CEC layer has a thickness of 0 to 20 nm;
c) inkjet printing an image on the glass container.

Removing the CEC to level wherein the remaining CEC has a thickness of 0 to 20 nm of CEC is equivalent to a few monolayers or less. Preferably, the thickness of the remaining CEC is between 0 and 10 nm, and even more preferably between 0 and 5 nm.

In a preferred embodiment of the present invention, the CEC may be at least partially water soluble and can be at least partially removed by rinsing with tap water, technical water, purified water or distilled water. Depending on the rinsing time and temperature, the level of remaining CEC may then be varied or optimized from less than 20 nm to two or one monolayers, or to a level that only separated traces remain on the surface, or up to complete removal.

Techniques for removing a non-water soluble CEC may be chemical etching, sand blasting, dissolving in organic solvent, flame or plasma treatments, etc.

In a specific embodiment of a method of the present invention, rinsing the CEC for at least partially removing it from the glass container may be performed with technical water, tap water, purified water or distilled water at a temperature between 20° C. and 90° C., preferably at 40° C. Rinsing time may vary between 0.1 and 15 seconds, or between 0.1 and 10 seconds depending on the level of removal of the CEC.

After rinsing, the rinsed glass container may be dried by removing water in a predominantly liquid phase, for example by blowing away the water droplets or by centrifuging the bottles. It was unexpectedly found that by actively removing water in liquid state (i.e. avoiding drying), the adhesion as well as print quality of the prints, e.g. color aberrations and resolution is significantly improved compared to print quality on a glass substrate from which the CEC was at least partially removed by rinsing and subsequently dried. Without being bound by any theory, the assumed reason is that water stains left after drying may increase the tendency of the mobile and lower-viscous inkjet inks to move on the surface before solidification.

In a particular embodiment in accordance with the present invention, the method comprises the steps of:
a) manufacturing a glass container having an at least partially water soluble CEC layer;
b) removing at least part of the CEC layer to a level wherein the remaining CEC layer has a thickness of 0 to 20 nm by rinsing the CEC from the glass container with water and blowing the water from the container by means of a pressurized air stream,
c) inkjet printing an image on the glass container.

Preferably, water is blown from the container's out surface by means of a laminar flow of pressurized air.

For blowing water (droplets) from a rinsed glass container, air manifolds may be used consisting of a closed section of pipe connecting to an air supply. Small holes are provided along the length of the pipe. Air passes through the holes and is directed at the bottles or cans in an effort to blow off the rinsing liquid. Also flat air nozzles may be used, which in fact is also a closed section of pipe, but the small holes are replaced by a number of flat nozzles.

For reasons of increased efficiency, noise reduction, and reduced air and energy consumption, preferably air knives (also called air blades) may be used, or an air knife assembly consisting of at least one and preferably two or more air knives. An industrial air knife is a pressurized air plenum containing a series of holes or continuous slots through which pressurized air exits in a thin line in a laminar flow pattern. The exit air velocity then creates an impact air velocity onto the surface of the bottle. The thin line of air can be carefully positioned with respect to pitch, roll and yaw angles to accurately strike the bottles as they pass in front of the knife to dewater an area where printing is to occur.

The air knifes may be positioned immediately adjacent the ink jet print head.

Preferably the air knife (or knives) may be positioned pointing upstream of the position at which is are located, and the air emitted therefrom strikes the bottles prior to the bottles reaching the air knife.

Further, the air knife may be positioned such that the linear air flow strikes the upper area to be dewatered and forces the water downwardly. As a bottle moves toward the air knives, the increasing air pressure continues to push the liquid downwardly and off the bottle.

In a particular embodiment in accordance with the present invention, the CEC is removed to a level that increases the slip angle of the glass bottle with at least 6°, or at least 10°, or even at least 20°. Slip angles are determined by putting one bottle on top of two horizontal bottles of the same type, in line contact. The tilt angle is increased at a certain speed and the tilt angle on which the top bottle starts to slide off is called the slip angle. A slip angle may have value of more than 30° to less than 10°.

In case the CEC is completely removed, the HEC may be the surface on which the image is ink jetted.

Alternatively, in an embodiment in accordance with the present invention, a method of inkjet printing an image on a glass container is provided, wherein a primer layer is applied on the glass container after at least partial removal of the CEC and prior to inkjet printing an image on the glass container. Such primer may be pigmented, white or transparent and may comprise an adhesion promotor. Such primer may also be energy-curable such that the inkjet ink can be jetted onto the wet primer, wherein the inkjet ink has a viscosity that is lower than the primer viscosity, and wherein the primer and the inkjet ink can be simultaneously energy-cured. Such primer may be pigmented, white or transparent and may comprise an adhesion promotor. Such primer may also be oxidized by flame, corona, or plasma treatment to enhance adhesion of the inkjet ink. A white pigmented primer, typically containing e.g. titanium dioxide, is preferably used to enhance the contrast and the vividness of color inks printed on a primed substrate. This is especially effective when the substrate is transparent. In particular, the primer may comprise a radically reactive group moiety such as a thiol group, an amine group, or an ethylenically unsaturated group such as a vinyl ether, a vinyl ester, an acrylamide, a methacrylamide, a styril, or preferably an allyl, an acrylate, or a methacrylate.

The remaining CEC, or in case of complete removal of CEC, the HEC or the primer layer may be at least partially oxidized by flame, corona, or plasma treatment in order to enhance adhesion of the inkjet ink thereto.

In a further embodiment in accordance with the present invention, after the flame, corona, or plasma treatment, a silicon based, preferably silica based (e.g. pyrosil) layer may be applied on the glass container. So, this silicon based layer may be applied on at least partially oxidized remaining CEC, on at least partially oxidized HEC, or on at least partially oxidized primer before inkjet printing the image. Such silicon containing layer provides increased bonding sites for the inkjet layer(s). Furthermore, they may result in a rough nano-porous material surface for increased adhesion and a surface with a higher surface energy. It may be deposited for example by flame pyrolysis. Precursors may be delivered as a vapor, an atomized liquid, an atomized solution, and/or the like.

Preferably, glass containers manufactured according to a method of the present invention are filled after inkjet printing the image thereon in order to avoid damage to the inkjet printer due to accidental bursting of the filled glass container.

In the step of inkjet printing, the inkjet print head may scan back and forth in a longitudinal direction across the moving glass container, and the inkjet print head may not print on the way back. However, bi-directional printing may be used and may be preferred for obtaining a high area throughput on big size glass containers. Another preferred printing method may print also in multiple passes but in a transversal direction (circular around the bottle). In this method, the relative position of the bottle versus the printhead can be changed after every pass in order to print images that are larger than the size of one print head. This necessitates stitching of the print artwork. Another variation on this method uses relative movement of the bottle vs the printhead while printing the different passes: one obtains spiral printing across the bottle. In the latter, stitching defects will be less pronounced. Another preferred printing method may be by a "single pass printing process", which can be performed by using wide inkjet print heads or multiple inkjet print heads which cover the entire width of the image to be printed (staggered or connected to each other). In a single pass printing process the inkjet print heads usually remain stationary and the substrate surface is transported under the inkjet print heads.

Inkjet printing techniques as used in the present invention may be piezoelectric inkjet printing, continuous type and thermal, electrostatic and acoustic drop on demand type.

A preferred jetting temperature is between 10 and 70° C., more preferably between 20 and 60° C., and most preferably between 25 and 45° C.

Non curing solvent or water-based inkjet inks may be used, but preferably energy-curable inkjet ink is used. Radiation curable inkjet ink, can be cured by exposing to actinic radiation and/or by electron beam curing. Preferably the radiation curing is performed by an overall exposure to actinic radiation or by an overall electron beam curing. Thermally curable inkjet ink can be cured by convection oven, infrared lamps, or the like.

The curing means may be arranged in combination with the print head of the inkjet printer, travelling therewith so that the inkjet ink is exposed to curing energy very shortly after been jetted. In such an arrangement it can be difficult to provide a small enough energy source connected to and travelling with the print head. Therefore, a static fixed energy source may be employed, e.g. a source of curing UV-light, connected to the radiation source by means of flexible radiation conductive means such as a fiber optic bundle or an internally reflective flexible tube. Alternatively, the actinic radiation may be supplied from a fixed source to the print head by an arrangement of mirrors including a mirror upon the print head.

The source of radiation arranged not to move with the print head, may also be an elongated radiation source extending transversely across the ink layer(s) to be cured and adjacent the transverse path of the print head so that the subsequent rows of images formed by the print head are passed, stepwise or continually, beneath that radiation source. The radiation source is preferably an ultraviolet radiation source, such as a high or low pressure mercury lamp containing optional sloping elements, a cold cathode tube, a black light, an ultraviolet LED, an ultraviolet laser or a flash light.

Furthermore, it is possible to cure the inkjet printed image using, consecutively or simultaneously, two light sources of differing wavelength or illuminance. For example, the first UV-source can be selected to be rich in UV-A, e.g. a gallium-doped lamp, or a different lamp high in both UV-A and UV-B. The second UV-source can then be rich in UV-C, in particular in the range of 260 nm-200 nm. The use of two UV-sources has been found to have advantages e.g. a fast curing speed.

For facilitating curing, the inkjet printer often includes one or more oxygen depletion units. The oxygen depletion units place a blanket of nitrogen or other relatively inert gas (e.g. CO2), with adjustable position and adjustable inert gas concentration, in order to reduce the oxygen concentration in the curing environment. Indeed, oxygen can act as a radical scavenger, taking away available radicals from the polymerization reaction. Residual oxygen levels are usually maintained as low as 200 ppm, but are generally in the range of 200 ppm to 1200 ppm.

In the context of the present invention, the image to be inkjet printed may comprise any type of picture, logo, text, graphic art, coding (QR-code, barcode) and the like.

EXAMPLE

Materials and Procedures:
Bottle Samples:
Bottles A: Unprinted Victoria 12 oz bottles (amber glass) were purchased from Nueva Fábrica Nacional de Vidrio, S.A. de C.V. (Mexico). These bottle were produced with a partially water soluble CEC based on ARCOSOL M-70 commercially available from ARCO, S.A. de C.V. (Mexico).

Bottles B: Unprinted one-way 33CI Adriaan brown bottles were purchased from Ardagh. These bottles were produced with a water non-soluble CEC based on RP 40 commercially available from Arkema.
Bottle Rinsing:
The bottles were rinsed with distilled water for 10 seconds at room temperature. The bottles were successively blow-dried with compressed air.
Slip Angle:
Slip angle measurements were performed with a Tilt Table commercially available from Agr International, Inc. The angle speed was set at 3.6°/sec. For each condition, the slip angle was measured for 9 bottles and the average slip angle value was calculated.
Printing:
Inkjet-printing of the bottles were performed on a "Laboratory Unit" commercially available from CURVINK by (Netherlands) equipped with a flaming lab module and a primer application lab module. Following procedure was followed for printing the bottles:

The bottles were flamed with the flaming lab module using a speed of 250 mm/sec. The bottles were successively coated in the flaming lab module with pyrosil (commercially available from Sura Instruments). A 0.2% pyrosil concentration was used and the pyrosil speed was set at 250 mm/s. The bottles were removed from the flaming lab module and cooled down under ambient conditions at room temperature. The bottles were successively coated with the primer application lab module using a alkoxy silane—based primer in a 2-revolution mode. The bottles were dried under ambient conditions during 8 minutes. The bottles were successively placed in the inkjet module and the bottle body was inkjet printed with a UV-curable acrylic-based white ink. The white ink was jetted with a GS12 XAAR 1001 head in a single pass mode using grey scale level 5. A uniform full white design as well as text was printed. The pinning level was set at 1% and was performed with a 8W LED bar from Hoenle. Finally, the bottles were taken out of the inkjet module and fully cured with a UV-bulb in an 8 rotation mode.
Pasteurization Simulator:
In order to simulate a pasteurization process, the bottles were placed in a water bath. The following temperature program was followed: 10 minutes at 45° C., 20 minutes at 62° C. and 10 minutes at 30° C. The bottles were removed from the water bath and dried in ambient conditions.

Line Simulator:
For each condition, 28 bottles were placed in a line simulator commercially available from Agr International, Inc. This simulates the conditions a bottle undergoes in a packaging line. The following settings were selected: water faucet on; abrader plate+height at EFG-2; speed control at 8 (60 rpm); gate pressure at 40% slippage (36 rpm for bottles). The bottles were placed during 30 minutes in the line simulator and inspected visually for potential damages to the art work.
Results:
The slip angle of Bottles A and B was measured before and after bottle rinsing. For bottles B: a slip angle of 14° was found before rinsing and 15° after rinsing. For bottles A: a slip angle of 5° was found before rinsing and 27° after rinsing. Bottles A and B were printed according to the above mentioned printing procedure with or without previous rinsing step. It was found that the print quality of the prints on Bottles A was better than the print quality of the prints on bottle B. Especially the printed text showed more print defects on Bottle B than on Bottle A. The bottles were successively placed in a pasteurization simulator, line simulator, and visually inspected. It was found that the printed artwork on bottles B showed much more damages than the printed artwork on bottles A.

The invention claimed is:

1. A method of inkjet printing an image on a glass container comprising the steps of:
    (a) providing a glass container having a cold-end coating (CEC) layer, wherein the CEC layer is at least partially water soluble;
    (b) removing part of the CEC layer to a level wherein the remaining CEC layer has a thickness of up to 20 nm by rinsing the CEC from the glass container with water;
    (c) blowing the water from the container by means of a pressurised air stream; and
    (d) inkjet printing an image on the glass container;
    said glass container having an internal burst pressure of at least 7 bar after being exposed to the printing.

2. The method according to claim 1, comprising the step of applying a primer layer on the glass container after at least partial removal of the CEC and prior to inkjet printing an image on the glass container.

3. The method according to claim 1, comprising the step of applying a protective layer and/or clear coating on top of the inkjet printed image.

4. The method according to claim 1, wherein the CEC from the glass container is rinsed with water at a temperature between 20° C. and 90° C.

5. The method according to claim 1, wherein removal of the CEC increases the slip angle of the glass container with at least 6°.

6. The method according to claim 1, comprising the steps of filling the container with a liquid, preferably a beverage after inkjet printing the image thereon.

7. The method according to claim 1, wherein the remaining CEC layer has a thickness of up to 10 nm.

8. A glass container having an outer glass surface with an inkjet printed image provided on said surface, wherein a cold-end coating (CEC) with a thickness up to 20 nm is present between the outer glass surface and the inkjet printed image; wherein said glass container is obtained by a method according to claim 1.

* * * * *